United States Patent

[11] 3,615,696

[72] Inventors Loren B. Sjöström
Wakefield;
John H. Moriarty, Melrose, both of Mass.
[21] Appl. No. 746,237
[22] Filed July 22, 1968
[45] Patented Oct. 26, 1971
[73] Assignee Ancheuser-Busch, Incorporated
St. Louis, Mo.

[54] YEAST SENSORY STIMULATOR AND PROCESS OF MAKING SAME
9 Claims, No Drawings

[52] U.S. Cl. .................................................... 99/140 R,
99/59, 99/96
[51] Int. Cl. ..................................................... A23l 1/22,
A23c 9/12
[50] Field of Search ........................................... 99/96, 140,
91, 59; 195/48

[56] References Cited
UNITED STATES PATENTS
3,485,641  12/1969  Bundus et al. ................  99/140
OTHER REFERENCES
" Difco Manual of Dehydrated Culture Media & Reagents for Microbiological & Clinical Laboratory Procedures," Ninth Edition, Difco Labs, Detroit, Michigan (1953), p. 213.

*Primary Examiner*—Morris O. Wolk
*Assistant Examiner*—Warren Bovee
*Attorney*—Gravely, Lieder & Woodruff

ABSTRACT: Yeast sensory stimulator factor produced during the growth of *L. casei* on a suitable yeast sensory stimulator producing media. This factor, when added to food and beverage products, produces taste and salivating characteristics readily discernible to trained flavor panelists.

YEAST SENSORY STIMULATOR AND PROCESS OF MAKING SAME

BACKGROUND OF THE INVENTION

It has been a general impression over the years that commercial bread has lost much of its traditional flavor. At least one of the reasons for this loss may be refinements in the production of bread yeast where yeast cells are selected for $CO_2$ production, and whose growth is enhanced by the use of specific yeast foods and media. Much emphasis has been given to minimizing bacterial contamination.

Bread flavor must, like other edible products, fulfill the criteria necessary for proper flavor and, hence, acceptability. Both the aroma and flavor by mouth must be well blended and have body and be interesting. The total impression perceived must be appropriate and desirable and sufficiently intense to bring about a satisfactory sensory response. The individual character notes that might be expected to be present are more difficult to outline, but from our recollections we can expect the aroma to be full and complex with fermentative notes playing a major role. In flavor by mouth, the basic tastes of swe et and sour plus fermentative notes closely associated with these basic tastes would likewise be present. The flavor should have a clean aftertaste and should provide a feeling of "moreishness." The ultimate bread flavor, therefore, should be able to stand by itself without supplements or other additives being necessary. It must therefore be a flavorful food entity which provides both in aroma and flavor by mouth an immediate impression of acceptability. Texture is also considered as part of the total flavor. Here we are looking for a nongummy but fairly resistant textural characteristic as opposed to the raw doughy texture of present commercial white bread. It must be stressed that all elements of taste, mouth sensations, and textural effects combine to provide a total impression so all must be considered. All flavor evaluations and analyses set forth in this application are made with the flavor profile methodology and trained flavor panelists, which technique is fully set forth in an article entitled "Flavor Profiles—A New Approach to Flavor Problems" by S. E. Cairncross and L. B. Sjostrom published in Food Technology, 1950, Vol. IV, No. 8, pages 308-311.

DETAILED DESCRIPTION

The criteria for judging bread which will be used as illustrative of the flavor characteristics imparted by the product of the present invention are set forth as follows:

A Recollection of the Flavor By Mouth Profile of "Old-Fashioned" Bread

| Character Notes | Intensity* |
| --- | --- |
| Amplitude | 2½ |
| Alcohol estery complex (mostly ethyl alcohol with a lesser amount of amyl alcohol plus low level fruity esters) | 1½ and fleeting |
| Toasted grain | 1 |
| Sour | ½ |
| Fatty acid complex (buttery-cheesy) | ½ |
| Cooked dough | ½ |
| Sweet | ½ |
| Bitter | ½ |
| Salivating and mouth effects | )( [quick cutoff] |

3=High
2=Medium
1=Low
)(=Barely noticeable

In making bread two standard commercial processes are used. These are the sponge dough method and the continuous mix method. Hereinafter set forth are detailed procedures according to each of these methods. These procedures were followed in all data for bread incorporated herein.

Standard Bread Formula (Sponge Dough)

Timing:
Allow 20 minutes between the mixing of each loaf to allow enough time between scaling and molding of dough. Approximately 6½ hours should be allowed from start to finish of each loaf.

Sponge:

|  | Grams | Percent |
| --- | --- | --- |
| Flour | 227.5 | 65.0 |
| Yeast | 8.75 | 2.5 |
| Yeast food | 1.75 | 0.5 |
| Enrichment | 0.06 | 0.017 |
| Water (distilled) (variable) | 140 ml. | 40.0 |

Place dry ingredients in McDuffee bowl for C-100 Hobart mixer. Add water. Mix 1 minute at speed 1. Mix 2 minutes at speed 2. Place sponge in 3-quart stainless steel bowl in fermentation cabinet maintaining temperature of 80° F. and relative humidity of 80–85 percent. Cover bowl with damp Turkish towel. Ferment for 4 hours.

Dough:

|  | Grams | Percent |
| --- | --- | --- |
| Flour | 122.5 | 35.0 |
| Sugar | 28 | 8.6 |
| Nonfat dry milk | 12 | 3.4 |
| Shortening | 10 | 2.9 |
| Salt | 6.5 | 1.8 |
| Calcium Propionate (Guard) | 0.7 | 0.2 |
| Water (distilled) (variable) | 60 ml. | 17.1 |

Place dry ingredients in McDuffee bowl; add water. Mix 1 minute at speed 1. During this minute add the sponge which should be divided into thirds. Add a third of the sponge at 15, 25, and 35 seconds. Then mix 3 minutes at speed 2.

Floor Time:
Return dough to stainless bowl. Cover with damp Turkish towel. Let rest at room temperature (77° F.) for 20 minutes. Scale dough to 18½ oz. (518 grams). Return to bowl. Cover with damp towel.

Intermediate Proof:
Let dough rest for 10 minutes in bowl at room temperature.

Mold and pan:
Pass dough through sheeter twice, first at setting 8 or a roller separation of five-sixteenth inch; second at setting 5 or roller separation of three-sixteenth inch. Roll dough to form a loaf and seal edges. Place, seam side down, in greased 1-pound loaf pan.

Proof at 100° F. until dough is three-eighth inch above top of pan. While proofing, pan of dough is placed under a wire mesh that is covered with two thicknesses of damp Turkish towel.

Bake at 450° F. in rotary oven for 20 minutes. Remove from pan immediately after baking. Place on rack to cool.

Continuous Mix Bread

Timing:
. Allow 20 minutes between mixing of each loaf. Approximately 3 hours and 45 minutes should be allowed from start to finish on each loaf.

Brew:

|  | Grams | Percent |
| --- | --- | --- |
| Salt | 7.7 | 2.2 |
| Glucose | 10.5 | 3.0 |

| | | |
|---|---|---|
| MCP Dough Conditioner | 2.1 | 0.6 |
| Guard (Calcium propionate) | 0.35 | 0.1 |
| Water (distilled) | 227 ml. | 65.0 |
| Yeast | 10.5 | 3.0 |

Place dry ingredients in 500 ml. stainless steel beaker. Add water, then yeast. Place beaker in water bath at 86° F. Stir brew slowly for 2¼ hrs.

After 2 hours and 10 minutes, add 20 grams dextrose to brew (5.0 percent by weight of flour).

Dough:

| | Grams | Percent |
|---|---|---|
| Flour | 350 | 100.0 |
| Shortening | 10.5 | 3.0 |
| Bromate-Iodate (N/10) | 1ml. | 50 p.p.m. |

Place brew in McDuffee bowl; add dough ingredients. Place water bath at 105° F. under McDuffee bowl. Mix dough 1 minute at speed 1 and 4½ minutes at speed 2. Remove dough; scale to 18½ oz. (518 grams). Place in greased 3-quart stainless steel bowl at room temperature for 10 minutes. Cover bowl with damp Turkish towel.

Mold and pan:

Place dough gently between 2 sheets of Teflon. Pass dough and Teflon through sheeter twice, first at setting 9 (⅜ inch roller separation); second at setting 6 (¼ inch roller separation). Roll dough to form a loaf and seal edges. Place seam side down in greased 1-pound loaf pan.

Proof at 100° F. until dough is five-eighth inch above top of pan. While proofing, pan of dough is placed under a wire mesh that is covered with two thicknesses of damp Turkish towel.

Bake at 425° F. in rotary oven for 22 minutes. Remove from pan immediately after baking. Place on rack to cool.

Pan: Aluminum—9×5×2¾ inches.

The following table shows the flavor profile of bread prepared by a standard sponge dough process without the added YSS factors of the present invention.

The Flavor Profile of

Bread Prepared by a Standard (Sponge Dough) Process

AROMA

| | |
|---|---|
| Amplitude* | 1 |
| Fruity pungency | ½** |
| Sour | ½ |
| Flour (doughy) | 1½ |
| FLAVOR BY MOUTH | |
| Amplitude | 1 |
| Sweet | 1 |
| Flour (doughy) | 1½ |
| Sour (acetic) | 1 |
| AFTERTASTE | |
| Starchy | |

*Ampleness of Flavor Quality

3 = High

2 = Moderate

1 = Low

**Intensity Level

3 = High

2 = Moderate

1 = Low

The aroma of bread prepared from the Standard Formulation has only a slight total intensity with a fruity pungent and sour as top notes at a low intensity. The aroma lacks appropriate character notes and complexity that lead to a well-blended aroma.

The flavor is characterized by a low sweet and starchy character that resembles flour dough. Acetic sour was also present. The texture was described as gummy. The flavor can best be described as bland and seriously lacking in elements of interesting, blended, full-bodied flavor.

Following is a flavor profile of standard sponge dough bread with the additive of the present invention incorporated therein.

Flavor Profile of Standard (Sponge Dough) (350 g. flour)

Bread to which 22 ml. (0.75 g. solids) of an 18-hr. broth (L. casei cells removed) had been added at the sponge stage

AROMA

| | |
|---|---|
| Amplitude | 2 |
| Estery pungency | 1 |
| Alcoholic (EtOH) | ½ |
| Toasted—grainy | ½ |
| Flour (doughy) | ¼ |
| Sour | ½ |
| FLAVOR BY MOUTH | |
| Amplitude | 2 |
| Sweet | 1 |
| Sour | ½ |
| Toasted—grainy | 1 |
| Flour (doughy) | ½ |
| Estery-Alcoholic | 1 |
| *YSS salivating and other mouth effects | |

*Yeast Sensory Stimulator

The aroma of the Standard Formula white bread to which 22 ml. of an 18 hr. (cell-free) broth had been added was given a moderate amplitude with a predominant characteristic of an estery pungency at a low level. Ethyl alcohol, toasted-grainy, flour (doughy), and sour characteristics, all at very low levels, make up the other characteristics. The aroma, although low intensity, is complex and interesting.

In flavor by mouth, a similar moderate level amplitude was provided because of the complexity of the total flavor as well as its blendedness and interest factors shown. An important mouth effect called "Yeast Sensory Stimulator" (YSS) which occurs in the form of salivating and other effects in the flavor by mouth provides an identification as well as an interest factor. The uniqueness of the flavor effect is further illustrated by the presence of a high degree of "moreishness" which suggests repetitive bites.

Following is a flavor profile of a continuous mix bread with no YSS factor added. The arrows (↑) indicate that the flavor increased during testing and a check (✓) indicates the presence of the effect so designated.

FLAVOR PROFILE

Continuous Mix Bread

Control

AROMA

| | |
|---|---|
| Amplitude | 1 |
| Sweet | ½ |
| Sour | 1½ |
| Fruity | ½ |
| Flour doughy | 1 |
| Propionic sour | ½ |
| Yeasty | ½ |
| FLAVOR BY MOUTH | |
| Amplitude | ½ |
| Sweet | ½ |
| Flour doughy | 1 |
| Salty | ½↑ |
| Sour | 1↑1½ |
| Propionic sour | ½ |

| | |
|---|---|
| SAPP astringent + bitter | 1½ |
| AFTERTASTE | |
| Sour | 1 |
| Astringent | ½ |

Following is a flavor profile of continuous mix bread to which the YSS factor of the present invention has been added.

FLAVOR PROFILE

Continuous Mix Bread containing Cell-Free *L. Casei* Broth

AROMA

| | | |
|---|---|---|
| Amplitude | 2 | |
| Sweet | | 1 |
| Sour | | 1 |
| Fruity | | ½ |
| Flour doughy (grainy) | | 1½ |
| Propionic sour | | — |
| Yeasty | | 1 |

FLAVOR BY MOUTH

| | | |
|---|---|---|
| Amplitude | 2 | |
| Sweet | | 1 |
| Flour doughy (grainy) | | 1½ |
| Salty | | ½ |
| Sour | | 1 |
| Propionic Sour | | — |
| SAPP astringent + bitter | | — |
| YSS | | 1½ |

AFTERTASTE

| | |
|---|---|
| Sour | ½ |
| Salivating | V |

Following is an example showing the production of the yeast sensory stimulator factor by the fermentation of *L. casei* in a Micro Inoculum Broth. M.I.B. is a proprietary product of Difco Laboratories Inc. of Detroit, Michigan. This product is designated B320 by the maker.

EXAMPLE I

Ten ml. of Micro Inoculum Broth are inoculated with *L. casei* and incubated at 37° C. for 24 hours. Two subsequent transfers are made under the same conditions. Two ml. of the *L. casei* inoculum are transferred to one liter of freshly prepared Micro Inoculum Broth which is then incubated at 37° C. for 11–13 hours. Upon completion of the incubation time, the bacteria are separated from the broth by centrifugation at 1,000 r.p.m. The clear broth is refrigerated and is ready for use.

In determining the optimum incubation time, the following procedure was used:

Three liters of Micro Inoculum Broth are autoclaved at 15 pressure for 15 minutes, cooled, and then inoculated with 6 ml. of a *Lactobacillus casei* culture and growth of the bacteria followed by measuring acid production. Samples are taken at hourly intervals, centrifuged to remove the bacteria, and YSS potency measured by taste panel evaluation. Such evaluation shows that YSS reaches a maximum level at 11 hours and then declines slowly, there being little difference in potency between 11 and 13 hours of growth. (Log phase of growth.) The taste evaluation is made by mixing 2 percent flour with water, bringing this to a boil, simmering for about 5 minutes and adding the YSS samples in 1 percent, 0.1 percent and 0.01 percent by volume concentration.

Following is a detailed example showing the fermentation of *L. casei* on a 10 percent milk solids broth.

EXAMPLE II

The *L. casei* inoculum is prepared as described in example I. Two ml. of the inoculum are transferred to 1 liter of a broth composed of 10 percent milk solids which is then incubated at 37° C. for 11–13 hours. Upon completion of the incubation time, the bacteria are separated from the broth by centrifugation at 10,000 r.p.m. The broth is refrigerated and is ready for use.

The necessary milk solids concentration in the milk broth was determined as follows:

Broths are prepared with 2.5 5.0, 7,5 and 10 percent solids, autoclaved as before, and each broth is inoculated with *L. casei* and incubated at 37° C. for 13 hours. The broths are then centrifuged at 14,600×G and YSS potency evaluated by taste panel tests as for the Time Study. Results are shown in the following table.

| Milk Solids | YSS Potency |
|---|---|
| 2.5% | Very little salivation |
| 5.0% | Some salivation (low) |
| 7.5% | Moderately high salivation |
| 10% | Moderately high salivation |

These results indicate that significant YSS levels can be produced in a milk broth containing as little as 7.5 percent milk solids.

Little YSS factor appears to be developed in corn step liquor broth and in pantothenate assay medium by the taste panel tests of example I.

Suitable micro-organisms are of the *Lactobacillus* type and *L. casei* is particularly effective. After the fermentation, which has a maximum effective time of about 11 to about 13 hours for maximum production of YSS factor, the cells are removed from the broth, preferably by centrifugation. The cell-free broth can be further concentrated by centrifuging to separate the solids which can be mixed with flour for incorporation into dough. However, the basis for measuring the amount of additive is based on the cell-free broth for convenience of reference. On this basis, from about 1 percent to about 12 percent cell-free broth is added to baked goods. Best results are obtained with about 2 percent to 6 percent cell-free broth. The following table for bread and crackers shows results obtained with various amounts of a cell-free milk broth.

Bread

| | 1,000 g. flour | Flour-Concentrate Mix | Ml. L. casei Milk Solids Broth |
|---|---|---|---|
| | 1. Control | | |
| + but other flavor over-tones present | 2. Control | +10 g. | 115 |
| | 3. Control | +5 g. | 57.5 |
| optimal | 4. Control | +4 g. | 46 |
| | 5. Control | +2.5 g. | 28.75 |
| little effect | 6. Control | +1.0 g. | 11.5 |

Crackers

| | | | |
|---|---|---|---|
| sl. stale | 1. Control | | |
| good + toasted, grainy | 2. Control | +4 g. | 46 |
| good + slight, grainy | 3. Control | +2 g. | 23 |
| slight + sl. stale | 4. Control | +1 g. | 11.8 |

The yeast sensory stimulator factor also is effective in other food products as shown in the following examples:

1. Creamy Peanut Butter

*L. casei* milk broth was thoroughly mixed in a quantity of peanut butter and tasted at a level of 1 percent by weight. The sample had a slow flavor development in the mouth and that notes of raw peanut, burnt, and bitter were emphasized. This is an advantage in products in which additives are combined with peanut butter causing the peanut identity to be lost. Such products include peanut butter and jelly and peanut butter and bacon (derived) bits.

2. Deviled Ham

*L. casei* milk broth was added at 1 percent levels to a quantity of deviled ham and the flavor evaluated indicating a slight increase in the intensity of saltiness.

3. Canned Draft Root Beer

The root beer was examined with added *L. casei* milk broth at 0.01 percent, 0.1 percent, and 1.0 percent levels. The dried flour concentrate was added at the level of 0.1 percent. At all levels, the addition of the milk broth deflated the root beer flavor and $CO_2$ tingle. At the highest level (1 percent), a metallic can note was also evident. The root beer with 0.1 percent flour concentrate added was more blended in flavor with less projection of the character notes. This is considered a positive contribution in an improved flavor blend with a pleasant mouth effect and a slight "yeasty" character.

4. Old English Cheese Spread

*L. casei* milk broth was added at a level of 0.1 percent to the cheese with a resulting increase of sourness in the flavor. When the *L. casei* flour concentrate was added at 0.1 percent level, the cheese flavor type appeared to be more similar to that of "aged" cheddar cheese. This "aged" cheese flavor type is considered of particular interest in that it is, in effect, an immediate "aging."

5. Instant Coffee (Black)

Additions of both the *L casei* broth and flour dried samples at levels higher than 0.1 percent resulted in the character notes of burnt and bitter being emphasized.

The characteristics of the YSS factor itself are that it is soluble in 80 percent acetone and insoluble in 90 percent acetone. It also is soluble in 80 percent absolute alcohol and only partly soluble in 90 percent absolute alcohol. Also, the YSS factor is retained on a hydrogen form of ion exchange resin and can be eluted with 1N HCl. It is possible to precipitate an acetone-soluble fraction from the aqueous acid eluate.

As mentioned, the maximum YSS factor production occurs between 11 and 13 hours of *L. casei* growth. After this the amount of YSS factor decreases. However, the production of acid by *L. casei* continues to increase at approximately the same rate during the 10- to 18-hour portion of the growth of the micro-organism.

The most obvious effect noticeable to the untrained taste in crackers and bread into which the YSS factor is added is an increased salivating action. This means that one can chew and swallow a cracker containing YSS factor in much less time than an equivalent sized cracker without the YSS factor. Also, the crumbs or bits which normally are left in the mouth after chewing and swallowing are not as noticeably present in crackers into which the YSS factor is included. Food incorporated into the mouth must be in a soluble form before it can act on the taste buds, cracker tastes being more readily discernible to the eater. Also, the cracker does not stay in the mouth for a long period of time and possibly develop undesirable aftertastes. The mouth is left with a clean feeling because of the increased and rapid salivation so that the mouth is, in effect, cleaned after every bite.

The total impression of the flavor of baked bread is improved because of reduction of the raw flour doughy and acetic sour character notes. Another important flavor improvement is in the addition of character notes such as toasted grainy, estery-alcoholic, and salivating and other desirable mouth effects. This can be seen from the preceding tables in which the characteristics of the bread are measured by trained taste panelists.

The effect is slight when the *L casei* are grown on corn steep liquor and there is no or very little production when the *L. casei* are grown on a defined medium such as pantothenate assay medium (DIFCO) to which calcium pantothenate and folic acid have been added. Thus, the media must contain a YSS factor producing element. Therefore, even though a media may grow *L. casei*, this does not assure that the YSS factor is produced.

This invention is intended to cover all changes and modifications of the examples of the invention herein chosen for purposes of the disclosure which do not constitute departures from the spirit and scope of the invention.

What is claimed is:

1. A process for producing an enhanced flavor and salivating mouth effect in food products comprising the step of adding to a food product a yeast sensory stimulator factor which is produced during the growth of *L. casei* on a yeast sensory stimulator producing medium.

2. The process of claim 1 wherein the food product is cereal based.

3. The process of claim 1 wherein the food product is selected from the group consisting of bread, biscuits and crackers.

4. The process of claim 3 wherein the factor is produced by growing *L. casei* on a milk solids broth for about 11 to about 13 hours, separating the cells, and adding from about 1 percent to about 11 percent broth based on the flour in the food product.

5. A precess of producing yeast sensory stimulator factor, which when added to food products enhances the flavor thereof, comprising the steps of growing *L. casei* on a yeast sensory stimulator medium, limiting the growth to between about 11 and about 13 hours, and removing the cells from the broths, the recovered broth containing the desired factor.

6. The process of claim 5 wherein the factor is soluble in 80 percent acetone and insoluble in 90 percent acetone, the factor also being retained on a hydrogen form of ion exchange resin and can be eluted with 1N HCl.

7. The process of claim 5 wherein the media is about 7.5 percent to about 10 percent milk solids.

8. A yeast sensory stimulator factor which, when added to food products, produces an enhanced flavor characteristic comprising the elaboration product of *L. casei* grown on a yeast sensory stimulator providing medium for a period of about 11 to about 13 hours.

9. The product of claim 8 wherein the factor is soluble in 80 percent acetone and insoluble in 90 percent acetone, the factor also being retained on a hydrogen form of ion exchange resin and can be eluted with 1N HCl.

* * * * *